May 4, 1926.
D. L. SMITH
CLEAT FOR CONVEYER CHAINS
Filed Feb. 21, 1925
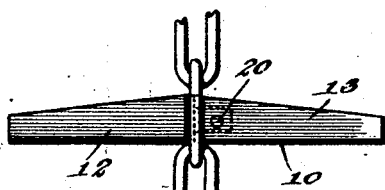
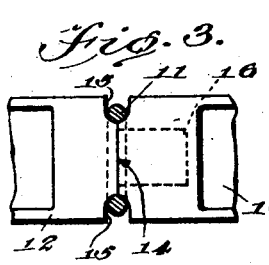
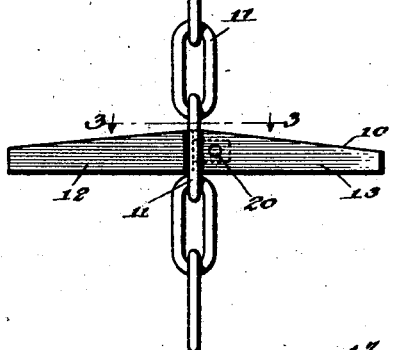
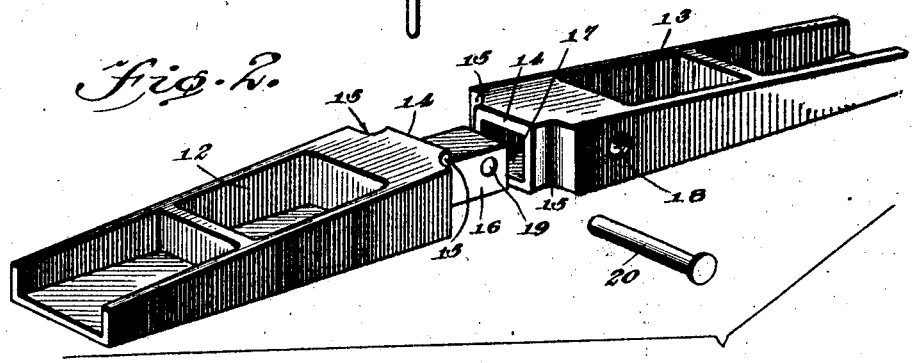
INVENTOR
D. L. Smith,
BY
ATTORNEYS Patented May 4, 1926.

1,583,614

UNITED STATES PATENT OFFICE.

DRAKEFORD LEWIS SMITH, OF VERNONIA, OREGON.

CLEAT FOR CONVEYER CHAINS.

Application filed February 21, 1925. Serial No. 10,907.

*To all whom it may concern:*

Be it known that I, DRAKEFORD L. SMITH, a citizen of the United States, and a resident of Vernonia, in the county of Columbia and State of Oregon, have invented certain new and useful Improvements in Cleats for Conveyer Chains, of which the following is a specification.

My present invention relates especially to cleats for conveyer chains and the like and has for its primary object the provision of an effective efficient cleat which may be easily mounted, readily renewed, and will function in practise with certain practical advantages which I will hereinafter describe.

In the accompanying drawing, forming a part of this specification and illustrating my present invention.

Figure 1 is a plan view of a portion of a conveyer chain showing the practical application of my invention thereto.

Figure 2 is an enlarged perspective view of the cleat with the parts thereof detached, and Figure 3 is a horizontal section taken on line 3—3 of Figure 1.

Referring now to these figures, I have shown a cleat 10 which it may be here mentioned is intended to be of a greater width than that of the links 11 of a chain with which the cleat is to be used. My improved link is in two sections 12 and 13 in endwise abutting relation, the abutting ends 14 being laterally reduced so as to enter the link 11 with which the cleat is mounted.

The lateral reduction of these abutting ends forms side recesses 15 which are rounded as shown so that with the ends 14 in abutting relation, the recesses coact to form side grooves for the reception of the sides of the link 11 within which the ends 14 abut.

The abutting end 14 of section 12 is moreover provided with an axially projecting reduced extension 16, preferably square, while the adjacent end of section 13 has a socket 17 which the extension 16 interfits. Section 13 also has transverse openings 18 through its walls at the sides of its socket to register with a transverse opening 19 through the extension 16 for the reception of a connecting rivet 20 by which the sections 12 and 13 are rigidly connected in conjunction with the chain link 11.

It is obvious my improved cleat may be easily and quickly mounted and will function in use in connection with conveyer chains to certain decided advantages among which may be mentioned reduction of driving power as the only bearing or friction load comes upon the cleats. This also lengthens the ordinary life of the chain very materially.

I claim:

A cleat for conveyer chains consisting of two endwise abutting sections having at their abutting ends a reduced extension on one section and a socket in the other section adapted to receive said extension, said sections having at the opposite sides of their said abutting ends recesses forming grooves adapted to receive the sides of a chain link when the said sections are engaged with one another through such link, the said abutting ends of the sections being otherwise solid and the said extension of one section snugly interfitting and completely filling the socket of the other section, and a rivet extending transversely through the extension of one section and through the end of the other section whereby to rigidly unite the solidly joined ends of the sections as described.

DRAKEFORD LEWIS SMITH.